United States Patent
Sood et al.

(10) Patent No.: US 6,718,834 B1
(45) Date of Patent: Apr. 13, 2004

(54) CARBON NANOTUBE FLOW SENSOR DEVICE AND METHOD

(75) Inventors: Ajay Kumar Sood, Kamartaka (IN); Shankar Ghosh, Kamataka (IN)

(73) Assignee: Indian Institute of Science, Kamataka (IN)

(*) Notice: Subject to any disclaimer, the term of this patent is extended or adjusted under 35 U.S.C. 154(b) by 0 days.

(21) Appl. No.: 10/306,838

(22) Filed: Nov. 29, 2002

(51) Int. Cl.[7] .................................................. G01P 5/08
(52) U.S. Cl. ................................................... 73/861.08
(58) Field of Search ......................... 73/861.08, 19.05; 166/336, 113; 423/445; 429/34, 37, 219; 428/408; 310/300; 385/22; 29/25.35

(56) References Cited

U.S. PATENT DOCUMENTS

| | | | | |
|---|---|---|---|---|
| 6,130,005 A | * | 10/2000 | Crespi et al. ............... | 429/219 |
| 6,250,131 B1 | * | 6/2001 | Pauley et al. .............. | 73/19.05 |
| 6,495,258 B1 | * | 12/2002 | Chen et al. ................. | 428/408 |
| 6,543,110 B1 | * | 4/2003 | Pelrine et al. ............. | 29/25.35 |
| 6,555,945 B1 | * | 4/2003 | Baughman et al. ......... | 310/300 |
| 6,558,645 B2 | * | 5/2003 | Nakayama et al. ..... | 423/445 B |
| 6,589,682 B1 | * | 7/2003 | Fleckner et al. .............. | 429/34 |

* cited by examiner

Primary Examiner—Edward Lefkowitz
Assistant Examiner—Jewel V. Thompson
(74) Attorney, Agent, or Firm—Nixon & Vanderhye P.C.

(57) ABSTRACT

A method and device for measuring the flow of a liquid utilizes at least one carbon nanotube. More particularly, the velocity of a liquid along the direction of the flow is measured as a function of the current/voltage generated in at least one carbon nanotube due to the flow of the liquid along its surface.

58 Claims, 5 Drawing Sheets

CARBON NANOTUBE FLOW SENSOR DEVICE AND METHOD

FIELD OF THE INVENTION

The present invention relates to a carbon nanotube—based liquid flow sensing device. The present invention also relates to a method for measuring the flow of a liquid using carbon nanotube. More particularly, the present invention relates to a method for measuring the velocity of a liquid along the flow thereof as a function of the current/voltage generated in carbon nanotube due to the flow of the liquid along the surface thereof. In another application, the present invention also relates to a device for the conversion of energy comprising using at least one carbon nanotube and also to a method for the conversion of kinetic energy of a liquid flow into electrical energy using one or more carbon nanotubes.

BACKGROUND OF THE INVENTION

The measurement of liquid velocity along the direction of flow is of significant importance in several applications. For example, an accurate determination of velocity of ocean or river tides along the direction of the flow is important in predicting tidal patterns, potential weather fluctuations, etc. Other areas where such liquid velocity determination along the flow are of importance include medical applications such as in cardiac and renal therapeutics.

Several methods are known in the art for the measurement of liquid velocity along its flow. For example, one method of low speed flow field velocity determination comprises particle imaging velocimetry, which comprises suspending colloidal particles in the liquid. A fast charge coupled device is provided across the planar cross section of the flow in order to image the colloidal particles. The small seed colloidal particles are illuminated using a laser light sheet. The charge coupled device camera electronically records the light scattered from the particles. Analysis of the image obtained enables determination of the particle separation, and thereby the velocity of the particles.

However, this method has several disadvantages. The primary disadvantage is the underlying assumption that the movement of all the colloidal particles assume the direction of the flow. This is not necessarily true in the case of large sized particles or in the case of very low velocities. Thus, the application of this method is limited to velocities of greater than 0.02 m/s. It is thus, also important in this method, to ensure that the particle size is small enough to ensure that the particle follows the flow of the liquid but at the same time is large enough to effectively scatter light. The equipment required (lasers, CCD cameras) is also large in size. Another disadvantage is that the method is dependant entirely on image analysis and thereby on the analysis algorithms. Since the particle imaging velocimetry method measures the velocity of the colloidal particles and there is no direct digital signal corresponding to the liquid velocity, the flow velocity of pure liquid cannot be measured. The method also is not appropriate for systems where optical access is absent and for liquids that are turbid.

Another method known in the prior art for liquid velocity measurement is Doppler velocimetry which comprises measurement of the Doppler shift of scattered light from micron sized particles suspended in the liquid. The method relies on the fluctuation in the intensity of scattered light received from colloidal particles entrained in a liquid when passing through the intersection of two laser beams. The Doppler shift between the incident and the scattered light is equal to the frequency of the fluctuation of intensity which is therefore proportional to the component of particle velocity lying in the plane of the two laser beams and perpendicular to their bisector. However, this method also suffers from several disadvantages. The method is operable where the particle velocities are greater than 0.001 m/sec. This method also requires large and expensive equipment such as a plurality of lasers and digital counters. Another significant disadvantage of this method is that it is restricted to a single point measurement with the data obtained being completely dependant on the particle arrival in the measuring volume and not on user requirements. Particle velocity and its derivatives differ in vortex cores and across shocks. Similar to particle imaging velocimetry, this method also requires that the particle size be small enough to flow along the liquid flow path easily but large enough to produce the required signal above the noise threshold. This method also does not work in systems where optical access to the liquid flow path at the measurement volume is absent. Signal level depends on the detector solid angle. As a result while the Mie scattering intensity is substantially better in the forward direction, it is difficult to set up forward receiving optics which remain aligned to the moving measurement volume. Greater noise at higher speed with radio frequency interference is possible. Again, similar to the PIV method, the flow velocity of unseeded liquids cannot be measured since there is no direct digital signal corresponding to the liquid velocity. This method is appropriate only for liquids containing colloidal particles and not for clear liquids.

Another known method to measure fluid velocity comprises the measurement of heat transfer change using a electrically heated sensor such as a wire or a thin film maintained at a constant predetermined temperature using an electronic control circuit. The heat sensor is exposed to the fluid whose velocity measurement is to be taken. The fluid flowing past the sensor cools the heat sensor which is compensated by the an increased current flow from the electronic control circuit. Thus, the flow velocity of the fluid can be measured as a function of the compensating current imparted to the heat by the electronic control circuit. However, in this method a slight variation in the temperature, pressure or composition of the fluid under study can result in erroneous readings. In order to maintain a relatively accurate measurement from the heat sensor, it is also necessary to provide complicated compensating electronics for constantly calibrating the sensor against any change in environmental parameters. In addition, even such compensating electronics can be subject to error. The sensor generally is operable at fluid velocities of greater than 0.01 m/s and not for very low velocities. At low velocities, the convection currents in the liquid cause a malfunction in the sensor.

Another method of liquid velocity measurement comprises calculating the velocity of the liquid flow as a function of vortices created downstream in the liquid using a bluff body or a shedder bar. The vortices are counted using piezoelectric sensors or ultrasonic sensors. This method is useful for measuring only flow rates greater than 0.001 L/s. The method focuses on measuring volumetric flow rates and not directly measuring flow velocities. Thus while useful for small flow rates, the device is not appropriate for liquids with high viscosity.

It is also known to calculate flow liquid velocity in high viscosity liquids using a plurality of pairs of piezo-resistive pressure sensors across an integrated fluid restriction in order to measure the differential pressure. However, while this device is operable at flow rates of the rate of a few μL/s, the volumetric flow rates and not flow velocities are measured. Also, this method is suitable for measurement of small flow rates only.

Yet another method for the measurement of flow velocities comprises the use of rotary flow meters which work on an arrangement of turbine wheels. The motion of the liquid through the turbine, otherwise called the rotor wheel, causes the turbine to rotate. The rotational frequency of the rotor wheel depends on the velocity of the liquid and is measured using either an electro-optical system or by electronically sensing the square wave pulse generated by magnets embedded in the turbine vanes. The size of the sensor arrangement is also to the order of 50 $cm^3$. The rotary flow meter is suitable for use in cooling systems irrespective of the nature of the liquid (clear or turbid) where measurement of large flow rates of over L/sec and the accuracy of the measurement of directionality of the liquid motion is about 50%. That is to say, the sensor can determine if the liquid is flowing in the forward or reverse direction.

As can be seen from the above discussion, the various methods known in the art for the measurement of flow velocities suffer from various disadvantages. Both particle imaging velocimetry and Doppler velocimetry require optical access and use lasers. The equipment size is also large rendering it expensive. Thermal anemometry requires large volumes of liquids in order to minimize convection currents and generally is suitable only for large velocities of greater than 0.01 m/sec. Thus it is not suitable for biological systems which involve small volumes of liquid flowing at low flow velocity. Rotary flow meters, pressure sensors and vortex flow sensors do not measure the flow velocities directly but rather the volumetric flow rates.

Another important area of investigation is the conversion of energy and energy conversion devices which are economical and possess a long life. One example of such an area is with respect to cardiac pacemakers. Cardiac pacing requires the periodical electrical simulation of the heart in order to control the timing and contractions thereof. Stimulation is for example obtained by electrical pulses generated by a cardiac pacemaker. It is for example known to measure cardiac performance using an internally implanted flow sensor. The flow sensor measures the blood velocity and communicates the information to the pacemaker which in turn estimates cardiac output in order to determine whether the blood flow pattern is abnormal and requires correction. It is also known to use flow sensors with implanted defibrillators which on verification of the absence of a heart beat in a patient apply a shock to the heat to restart the heart. Traditional flow sensors used in the field of cardiac pacemakers or defibrillators are discussed for example in U.S. Pat. No. 5,174,299. This disclosure teaches the use of a thermocouple to measure the velocity of blood flow. The flow sensor comprises two tubes of the same metal joined to each other through a middle tube of another metal. This forms two junctions. Wires are connected to the two junctions in order to convey a voltage to the pacemaker corresponding to the temperature difference between the two junctions. However, this device suffers from several limitations such as the inability to distinguish between forward, reverse and cross flow. Another disadvantage of this flow sensor is that a plurality of wires are required, for example for carrying the output voltage to the pacemaker and another pair to heat the flow sensor. An attempt to overcome this problem has been made in U.S. Pat. No. 5,831,159 which discloses the use of a plurality of thermocouples in series connection in the form of a thermopile as the flow sensor. The thermocouples comprise of two conductors of different metals joined together to form a junction. The unique construction of this device avoids the problems of plurality of wires by using the same wire pair as both the heat source for the thermopile as well as well as for carrying the current output to the pacemaker or defibrillator. However, the problem of an external power source to heat the thermopile is not avoided. The construction of this device is also quite complex and expensive. Neither of the two devices discussed immediately above provides a solution for battery replacement in the pacemaker or defibrillator itself.

Another area where energy conversion devices are required is for supply of electricity for domestic and industrial use. Currently, the demand for electrical energy worldwide is met by one of three sources: nuclear power, thermal power and hydroelectric power. Nuclear power plants require expensive safety equipment and measures in view of the potential for radiation leakage. Thermal power plants use fossil fuels which result in the attendant problems of pollution and also suffer from reduced supplies due to depletion of fossil fuels and oil. Hydroelectric power requires large dams to be constructed and is completely dependant on water flow in a river or any other water source. The equipment required is also expensive and occupies a large area. Of the various devices and methods of flow velocity measurement, only one, namely rotary flow sensor can actually also generate electricity due to the action of the liquid flow across the turbine blades. However, the magnitude of the power generated in relation to the size of the device renders it unsuitable for use for large scale energy conversion.

It would therefore be useful to develop a device which is capable of both measurement of flow velocities of a low range irrespective of the nature of the liquid and also as an energy conversion device irrespective of the scale of energy required.

OBJECTS OF THE INVENTION

The main object of the invention is to provide a flow sensor which is operable even at very low flow velocities of $10^{-8}$ m/s with accuracy in measurement and low response times of 0.01 seconds.

It is a further object of the invention to provide a flow sensing device which by its simplicity and small size of construction is economical, does not result in any turbulence in the liquid flow thereby ensuring accuracy in flow velocity measurement, and is impervious to variations in external parameters such as liquid or ambient temperature, pressure differential or viscosity.

It is another object of the invention to provide a flow sensing device which is operable irrespective of the nature of the liquid (whether clear or turbid, high or low viscosity) with accuracy in measurement and low response times of <0.1 seconds.

A further object of the invention is to provide a flow sensor device that does not require any external source of power for its operation.

It is another object of the invention to provide a flow sensing device which can determine the directionality of the liquid flow.

It is yet another object of the invention to provide a method for the determination of flow velocity of all liquids irrespective of their nature which does not require optical access, is operable even at low flow velocities of $10^{-8}$ m/s, irrespective of flow volumes, and is capable of biomedical applications.

It is yet another object of the invention to provide a method for the determination of flow velocities which does not require any external seeding with colloidal particles of determinate size in the liquid and is not susceptible to variations in external parameters such as liquid temperature, pressures at a particulate flow plane or viscosity.

It is another object of the invention to provide a flow sensor device capable of utilization as an energy conversion device capable of generating electrical energy based on liquid flow.

It is a further object of the invention to provide an energy conversion device which by its simplicity of construction is economical, does not result in any turbulence in the liquid flow thereby ensuring accuracy in flow velocity measurement, and is impervious to variations in external parameters such as liquid or ambient temperature, pressure differential or viscosity.

A further object of the invention is to provide an energy conversion device that does not require any external source of power for its operation.

Another object of the invention is to provide a method for the generation of electricity without reliance on any nuclear, thermal or hydroelectric power source and based purely on the flow of a liquid.

SUMMARY OF THE INVENTION

The above and other objects of the invention are related by the device of the invention which comprises the use of carbon nanotubes, whether single wall type of multi wall type as flow sensors. Both methods of the invention, namely, liquid flow velocity measurement and energy conversion are based on the induction of current/voltage in a carbon nanotube due to the flow of a liquid along its surface and along the direction of the flow.

Accordingly, the present invention provides a flow sensing device useful for measurement of liquid flow velocities irrespective of the flow velocity or the nature of the liquid, said device comprising at least one carbon nanotubes, each end of the at least one carbon nanotube being connected at each end thereof through at least a conducting element to a electricity measurement means.

In one embodiment of the invention, the carbon nanotube is a single wall type carbon nanotube.

In another embodiment of the invention, the carbon nanotube is of the material type carbon nanotube.

In a further embodiment of the invention, the electricity measurement means comprise a ammeter to measure the current generated across the opposite ends of said at least one or more carbon nanotube or a voltmeter to measure the potential difference across the two opposite ends of the said one or more carbon nanotube.

In another embodiment of the invention, the flow sensing device comprises of a plurality of carbon nanotubes all connected in series or parallel with a single conducting element each being provided at the respective extreme ends of the said plurality of carbon nanotubes.

In a further embodiment of the invention, the said plurality of carbon nanotubes are connected in series so as to measure the potential difference generated across the ends of the said plurality of carbon nanotubes.

In yet another embodiment of the invention, the said plurality of nanotubes are connected in parallel to each other so as to enable determination of the current generated across the two ohmic contacts formed by the respective conducting elements at the ends thereof.

In yet another embodiment of the invention, the conducting elements of the flow sensing device are provided with a protective insulating coating to prevent electrical contact with the liquid.

In yet another embodiment of the invention, the flow sensing device is provided on a insulated base.

In one embodiment of the invention, the conducting element comprises of a wire.

In one embodiment of the invention, the conducting element comprises of an electrode.

In yet another embodiment of the invention, the conducting element comprises of a combination of a wire connected to an electrode.

In another embodiment of the invention, the liquid whose flow velocity is determined is flowing water.

In yet another embodiment of the invention, the liquid is a biological fluid such as blood.

The invention also relates to a method for the determination of liquid flow velocities irrespective of the nature of the liquid or the flow velocity thereof, which comprises measuring in said liquid a flow sensing device comprising of at least one carbon nanotube connected at each thereof through at least a conducting element to a electricity measurement means, the liquid flow over said at least one carbon nanotube generating a flow of electricity along the direction of the liquid flow by forcing free charges present in the said at least one nanotube, said electrical energy being transmitted by said conducting element to said electricity measurement means provided external to the liquid flow, to measure the electricity generated as a function of the rate of flow of said liquid.

In one embodiment of the invention, the liquid comprises a polar liquid.

In a further embodiment of the invention, the polar liquid is selected from water and a biological fluid. The biological fluid may preferably be blood.

In another embodiment of the invention, the liquid comprises a non-polar liquid.

In a further embodiment of the invention, the non-polar liquid is selected from methanol, ethanol, and other non-polar liquid.

In one embodiment of the invention, the carbon nanotube is a single wall type carbon nanotube.

In another embodiment of the invention, the carbon nanotube is of the multiwall type carbon nanotube.

In a further embodiment of the invention, wherein the foregoing of the free charges is along the direction of the liquid flow due to the Coulombic interaction between the Coulombic field of the liquid and the free charges, thereby ensuring that only velocity along the direction of the liquid flow is determined.

In another embodiment of the invention, the immersion of the said at least one carbon nanotube in the liquid at rest generates a rest voltage in the nanotube, the exact velocity of the liquid flow being calculated as a function of the voltage generated in the carbon nanotube during flow after deduction of the rest voltage.

In another embodiment of the invention, the response time of the flow sensing device is less than 0.01 seconds.

The invention also relates to an energy conversion device comprising a energy generation means comprising one or more carbon nanotubes, each said one or more nanotube comprising of at least one carbon nanotube connected at each end thereof through at least a conducting element to a electricity storage or usage means to store or use the electricity generated in the said one or more carbon nanotubes due to the liquid flow along the surface thereof.

In one embodiment of the invention, the carbon nanotube as a single wall type carbon nanotube.

In another embodiment of the invention, the carbon nanotube is of the multiwall type carbon nanotube.

In one embodiment of the invention, the energy generation means comprises a plurality of carbon nanotubes.

In a further embodiment of the invention, the said plurality of carbon nanotubes are connected in series.

In a further embodiment of the invention, the said plurality of nanotubes are connected in parallel.

In yet another embodiment of the invention, the conducting elements of the energy conversion means are provided with a protective insulating coating to prevent electrical contact with the liquid, thereby ensuring that accidental discharge of electricity generated due to liquid flow along the surface thereof to the liquid does not occur.

In yet another embodiment of the invention, the energy conversion means is provided on an insulated base.

In another embodiment of the invention, the energy storage means comprises of a battery or storage cell.

In one embodiment of the invention, the conducting element comprises of a wire.

In a further embodiment of the invention, the conducting element comprises of an electrode.

In yet another embodiment of the invention, the conducting element comprises of a combination of a wire connected to an electrode.

In another embodiment of the invention, the liquid whose flow velocity is determined is flowing water.

In yet another embodiment of the invention, the liquid is a biological fluid such as blood.

The invention also relates to method for the generation of electrical energy using an energy conversion device comprising a energy generation means comprising one or more carbon nanotubes, each said one or more nanotube comprising of at least one carbon nanotube connected at each end thereof through at least a conducting element to a electricity storage or usage means, the flow of the liquid along the surface of the energy conversion means forcing the free charges in the said one or more carbon nanotubes to flow along the direction of the liquid flow, thereby generating electrical energy, said electrical energy being transmitted to the energy storage or usage means through the said conducting elements.

In one embodiment of the invention, the carbon nanotube is a single wall type carbon nanotube.

In another embodiment of the invention, the carbon nanotube is of the multiwall type carbon nanotube.

In one embodiment of the invention, the energy generation means comprises a plurality of carbon nanotubes.

In a further embodiment of the invention, the said plurality of carbon nanotubes are connected in series.

In yet another embodiment of the invention, the said plurality of nanotubes are connected in parallel.

In yet another embodiment of the invention, the conducting elements of the energy conversion means is provided with a protective insulating coating to prevent electrical contact with the liquid, thereby ensuring that accidental discharge of electricity generated due to liquid flow along the surface thereof to the liquid does not occur.

In yet another embodiment of the invention, the energy conversion means is provided on an insulated base.

In another embodiment of the invention, the energy storage means comprises of a battery or storage cell.

In another embodiment of the invention, the battery is a battery of a cardiac pacemaker device.

BRIEF DESCRIPTION OF THE ACCOMPANYING DRAWINGS

DETAILED DESCRIPTION OF THE INVENTION

All embodiments of the present invention are based on the induction of electrical energy in a carbon nanotube due to the flow of a liquid along the surface thereof and along the direction of the flow. This is irrespective of the velocity of the liquid flow or the nature of the liquid such as the purity or turbidity thereof, the volume of flow thereof at the measurement point, or of any variations in the external parameters such as liquid temperature, pressure or viscosity.

Carbon nanotubes possess unique showing structural, electronic and mechanical properties that have tremendous potential in many areas of technology such as in nanoelectronics, as actuators and sensors. Carbon nanotubes can be considered generally to comprise a shell of rolled graphite sheet with a diameter of one or two run and a length of a few microns. Carbon nanotubes possess a honey-comb structure wherein the ratio of the length of the diameter of the material is $>10^3$, thereby enabling their function as effective one dimensional systems. As a result of the effective one dimensional nature of carbon nanotubes, the pi-electrons from a Lutinger liquid (with strong correlation) that allows the separation of spin and charges. Carbon nanotubes also possess associated characteristics of power-law dependence of the nanotube resistance to the bias voltage and temperature.

Carbon nanotubes can be either single wall or multi-wall. Single wall carbon nanotubes comprise of a single shell whereas multi-wall carbon nanotubes are made of a plurality of concentric shells.

The invention will now be described with reference to the accompanying drawings. The drawings annexed to this description are exemplary and should not be construed as limiting the scope of the invention in any manner.

Figure 1:
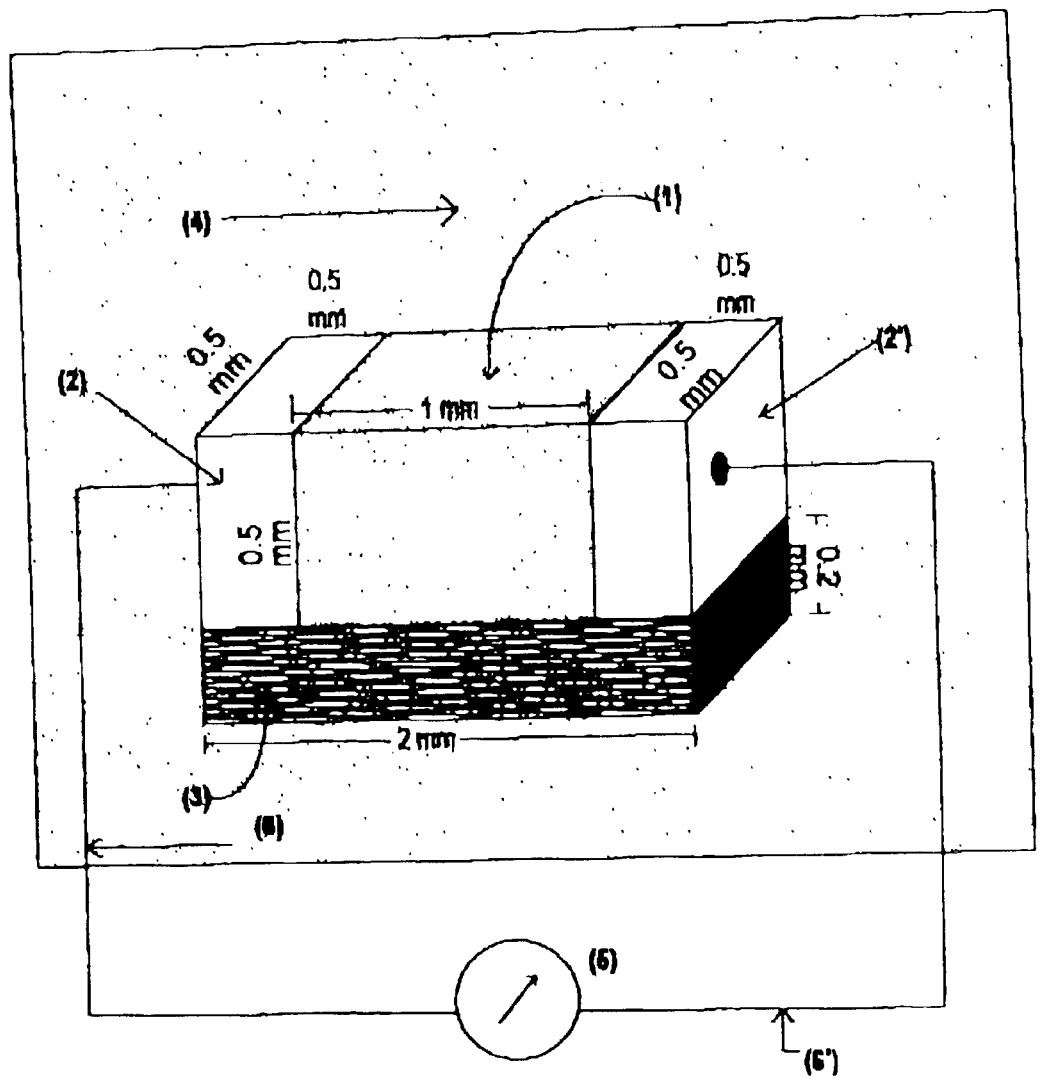
FIG. 1 is a schematic representation of the carbon nanotube and electrode sandwich used in the device of the invention.

FIG. 1 is a schematic representation of the flow sensing and energy conversion device used in various embodiments of the invention. In the embodiment depicted, a single carbon nanotube (1) is shown sandwiched between two metal electrodes (2,2') provided at each end thereof. The metal electrode (2,2') form ohmic contacts for the nanotube (1). The combination of the nanotube (1) and the metal electrodes (2,2') provided therein are supported on an insulating material base (3) made for example of polytetrafluoroethylene. The insulating base (3) with the nanotube (1) and electrode (2,2') are immersed in a liquid medium (4) whose velocity is to be measured. The dimensions of the liquid medium (4) as depicted are arbitrary. The electrodes are connected to an electricity measurement means such as voltmeter (5) through lead wires (6,6'). The voltage measurement means (5) is provided external to the liquid medium (4). The direction of the flow of the liquid medium (4) in FIG. 1 is depicted by the arrow on the left-hand top corner.

When the carbon nanotube with the conducting elements is immersed in a liquid, it develops a rest voltage of about 1 mV when the liquid is at rest. During the movement of the liquid, a voltage/current is induced along the direction of the flow of the liquid. The voltage produced fits a logarithmic velocity dependent over nearly six decades of the velocity. It is observed that the magnitude of the voltage/current produced depends on the ionic conductivity and the polar nature of the liquid. While optimum results are observed in polar liquids such a water or blood, non-polar liquids also result in the generation of electricity in the nanotube during their flow.

The momentum of the liquid molecules is transferred to the charge carriers in the nanotubes. The transfer of momentum to the charge carriers occurs due to both phonons and Coulombic interactions. The significant advantage of the device of this invention is that due to its substantially unidimensional structure, the electron (or charge) flow can be only either along the direction of the flow or in a direction opposite to the flow. It is observed that the charge carriers are preferentially scattered along the direction of the flow. As a result, the nanotube develops a voltage/current dependant on the velocity of the flow. The use of sensitive voltage/current measurement means ensures that even low velocity movement of flow can be determined with a high degree of accuracy with a speedy response time.

The electricity generated in the nanotube in the form of a non-linear response is the direct result of the forcing of the free charge carriers or electron in the nanotube, inter alia, due to the fluctuating Coloumbic field of the liquid flowing past the tube. It is observed that the response times of the nanotube based device are less than 0.01 second with a high degree of accuracy. The entire assembly of the flow sensing means and the conducting element is coated with an insulating varnish layer in order to prevent the accidental discharge of electricity in the nanotube into the liquid medium.

Figure 2:
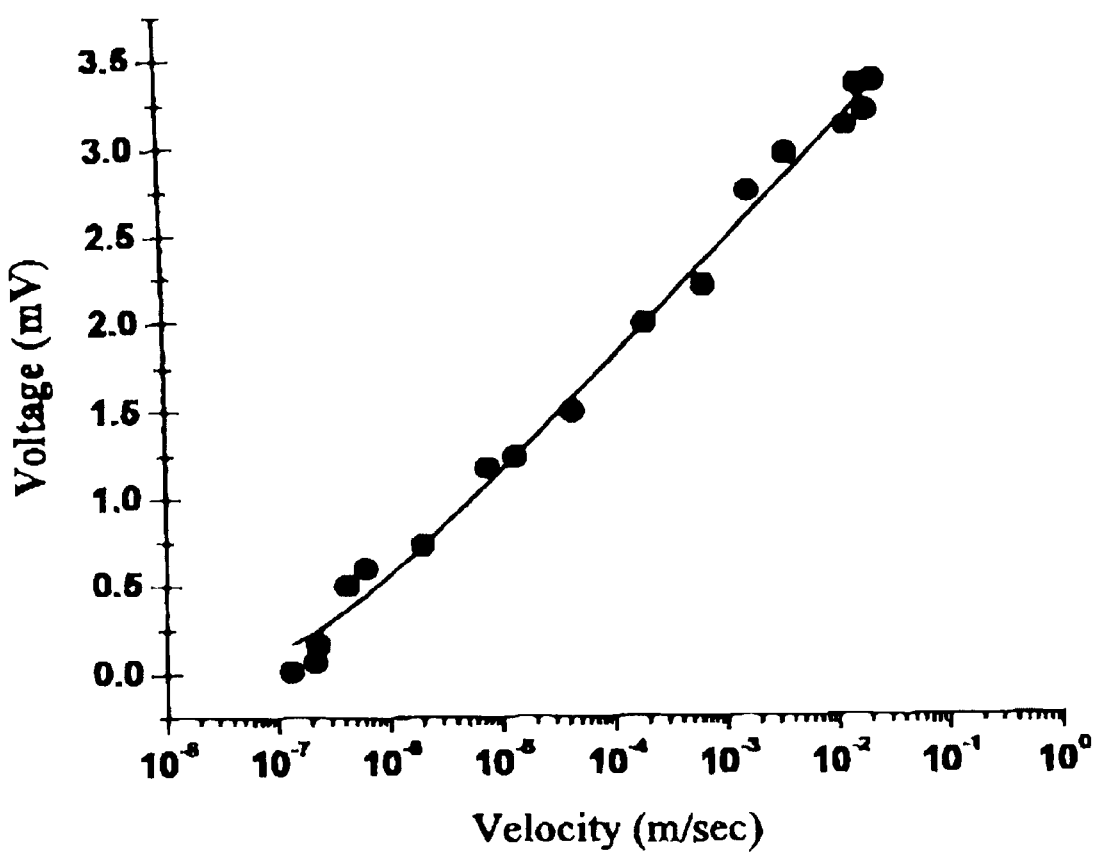
FIG. 2 is a graphical representation of the characteristics curve of the flow sensing device of the invention using water (conductivity=1 mS/cm) as the liquid.

FIG. 2 is a graphical representation of the characteristic curve of the flow sensing device of the invention using double distilled water as the liquid. The voltage is depicted along the Y axis with the liquid velocity along the X axis. The voltage (V) developed in the sensor ha a logarithmic dependence on the velocity (u) of the liquid which can be calculated according to the formula $V=\alpha \log(u\beta+1)$ where both $\alpha$ and $\beta$ are constants and depend on the nature of the liquid for their values. It was observed that in the case of a polar liquid such as water (conductivity=1 mS/cm), the induced voltage tends to saturate at flow velocities of as low as $10^{-5}$ m/s the magnitude of the voltage induced along the nanotube by the liquid flow depends on the ionic strength of the polar liquid.

This supports the belief that the direct forcing of the charge carriers in the nanotube is predominantly the result of interaction of the charges with the fluctuating Coulombic field of the flowing liquid and not the phonon mediated electron drag. Fluctuating Coulombic potentials due to the ionic liquid in flow where the asymmetry is provided by the shear at the liquid-solid interface. Thus the interaction can best be explained using an asymmetric pulsating thermal ratchet model.

Figure 3:
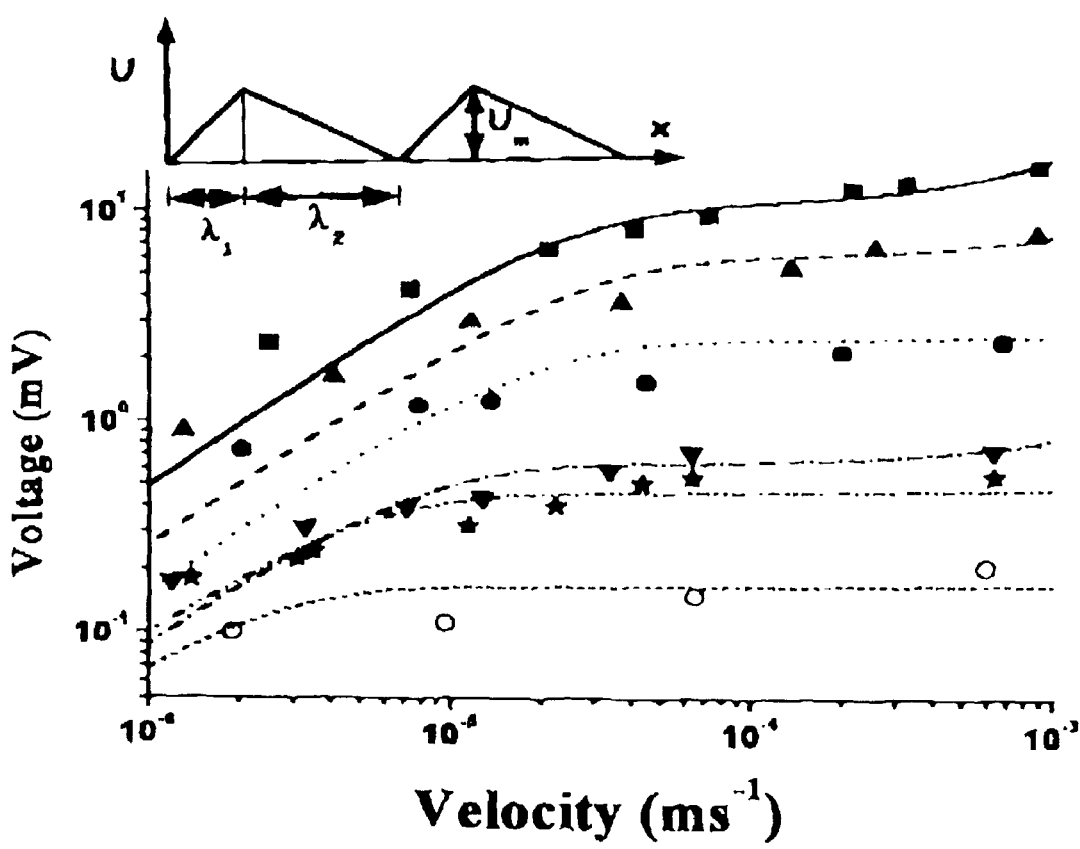
FIG. 3 is a graphical representation showing induced voltage as a direct function of liquid velocities of different liquids. The insert in FIG. 3 is a schematic representation of the asymmetric ratchet potential in the method of flow velocity measurement.

FIG. 3 is a graphical representation showing induced voltage as a direct function of liquid velocities of different liquids. The liquids used comprised water, methanol, HCl of different molar, water glycerol mixtures and water used to determine the relation between the induced voltage and liquid viscosity. Details are given in Example 2 below. The inset in FIG. 3 is a schematic representation of the asymmetric ratchet potential in the method of flow velocity measurement.

Figure 4:
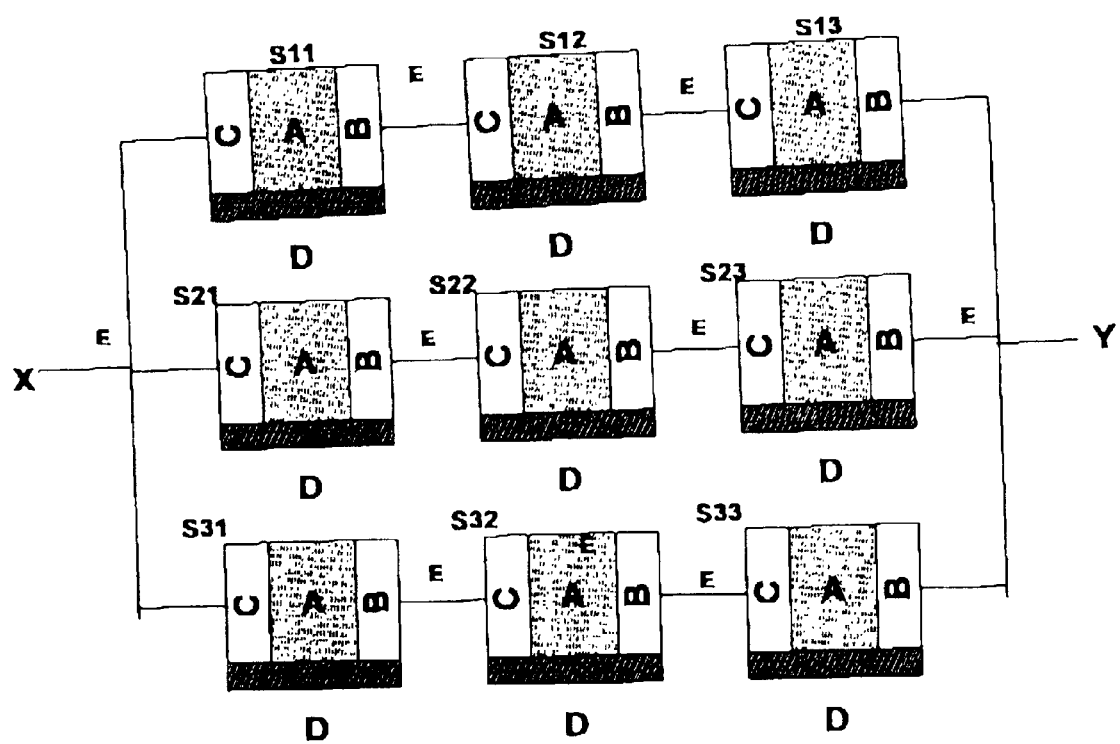
FIG. 4 is a depiction of the flow sensing device of the invention when used in the form a 3×3 matrix.

FIG. 4 is a depiction of the flow sensing device of the invention when used in the form a 3×3 matrix. The individual elements ($S_{num}$) of the matrix are connected by enamelled copper wires (E) which provide a path for the electricity induced in the nanotubes. The nanotubes used in FIG. 4 may be either single wall or multi wall nanotubes. The copper wires in conjunction with the electrodes (B,C) form the conducting element wherein the electrodes provide the ohmic contacts for the nanotubes. As in the case of the single nanotube depicted in FIG. 1, the entire matrix is provided on an insulating base made of for example polytetrafluoroethylene (not shown) with the nanotubes and the conducting elements assembly of the wires and electrodes all being coated with an insulating varnish (not shown).

The entire assembly is immersed in a moving liquid environment. It is observed that when the sensors are connected in senses, they form a voltage source with the voltage induced in the system being equal to the current generated times the resistance across the electrodes. Typically, for the type of matrix as depicted in FIG. 4, the current developed across X and Y is about 50 microamperes and 10 mV for water velocities of $10^{-6}$ m/s.

The flow sensing device of the invention functions for all liquids irrespective of the nature of the liquid concerned. Generally however, it is observed that the effectiveness is higher for polar liquids such as water or blood than for non-polar liquids such as methanol, ethanol or any other organic liquid. It was also observed that the electricity generated is more a function of the liquid flow velocity rather than the liquid viscosity.

The flow sensor also enables determination of the direction of the liquid flow since it is only the velocity of the liquid along the length of the nanotube which contributes to the generation of electricity in the sensor. The sensor also displays high sensitivity of measurement even at low velocities (to the order of $10^{-8}$ to $10^{-5}$ cm/sec). The response times were also generally measured as being less than 0.01 second, and more specifically less than 0.02 seconds. Another significant advantages of the invention is that the small size of the device ensures that the device itself does not cause any turbulence in the liquid movement thereby ensuring a substantial accuracy in the measurement of the velocity. The device also does not require either any colloidal particles as are required for example in PIV or Doppler velocimetry and is also not affected by external parameter variations such as in the temperature or pressure of the liquid.

The device is also of tremendous utility in cardiac pacemakers, where the device functions as a flow sensor for the blood flow velocity as well as generates electricity for the battery of the pacemaker.

Another significant advantage of the flow sensor device of the invention is that it does not require any external power source for operation. On the contrary, the device of the invention generates electricity. The movement of the liquid along the nanotube results in the generation of a current I. The electrical contacts at the ends of the nanotube have a resistance R, thereby enabling the formation of a voltage V across the sensor.

The invention will now be explained with reference to the following examples which are exemplary and should not be construed as limiting the scope of the invention.

EXAMPLE 1

Single wall carbon nanotube bundles were prepared by electric arc method followed by purification. The nanotube bundles prepared has an average tube diameter of 1.5 nm and were densely packed between two metal electrodes. The dimensions of the sensor sample were $1\times10^{-3}$ m along the flow, $2\times10^{-4}$ m thickness and $2\times10^{-3}$ m width. The resistivity of the sensor material was about 0.02 Ω-m, and the sensor has a linear current voltage characteristic of up to 20 mV. The nanotube sensor bundle was placed in the center of a glass tube with an inner diameter of ~0.03 m and length ~0.9 m in order to avoid any potential turbulent flow due to the expansion of the flow at the inlet of the flow chamber. The velocity u of the liquid flowing past the sensor bundle was measured from the bulk flow rate, which was varied by adjusting the height of the reservoir and opening of a valve. The liquid entered the flow chamber against gravity in order to avoid the formation of air pockets. The flow at the center of the flow chamber is expected to be laminar as the Reynolds number (Re~300 for a velocity of $10^{-2}$ m/s) is less than the critical value of 2000 for the onset of turbulence flow in a pipe. Measurements were taken after the transients subsided.

When the sensor bundle was immersed in water at rest, a rest voltage (~1 mV) developed along the sample due to the electrochemical potential difference at the interface of the bundle with the metal electrodes. This was compensated for by deducting this value from the final measurements. Its was observed that voltage developed only along the direction of the flow and not perpendicular thereto. At low velocity of $5\times10^{-4}$ m/second, an appreciable voltage of 0.65 mV was generated. The solid line in FIG. 2 giving the values fits the empirical relation of $V=\alpha\log(\alpha\beta+1)$ where $\alpha=0.6$ mV and $\beta=6.5\times10^6$ seconds/meter and both $\alpha$ and $\beta$ are parameters. As can be seen the flow induced voltage is nearly substantially logarithmic to the flow velocity $\alpha$.

EXAMPLE 2

In order to determine the relation between the voltage generated and the liquid viscosity $\eta$, the experimental set up of Example 1 was repeated with different liquids. The liquids used were a water—glycerol mixture of water glycerol=88:12 ($\eta$=113 mPas) and water:glycerol=75·25 ($\eta$=234 mPas). These mixtures have viscosity of about two orders of magnitude higher than that of water ($\eta$=0.9 mPas). Other liquids tested comprised of methanol, 0.6M HCl and 1.2MHCl. The values obtained are given in FIG. 3. It was also observed that the voltage developed in the case of polar liquids such as water were higher than for non-polar liquids such as methanol. Thus for $\mu=6\times10^{-4}$ m/s, $V_{water}$=2.1 mV, whereas $V_{methanol}$=0.2 mV. The data obtained confirmed that the voltage response to flow velocity is sublinear (nearly logarithmic), is also dependant on the sonic and polar nature of the liquid and is relatively weakly dependant on the viscosity of the liquid.

EXAMPLE 3

Single wall carbon nanotube bundles were prepared by electric arc method followed by purification. The nanotube bundles prepared had an average tube diameter of 1.5 nm and were densely packed between two metal electrodes. The dimensions of the sensor sample were $1\times10^{-3}$ m along the flow, $2\times10^{-4}$ m thickness and $2\times10^{-3}$ m width. The resistivity of the sensor material was about 0.02 Ω-m, and the sensor has a linear current voltage characteristic of up to 20 mV.

Figure 5:
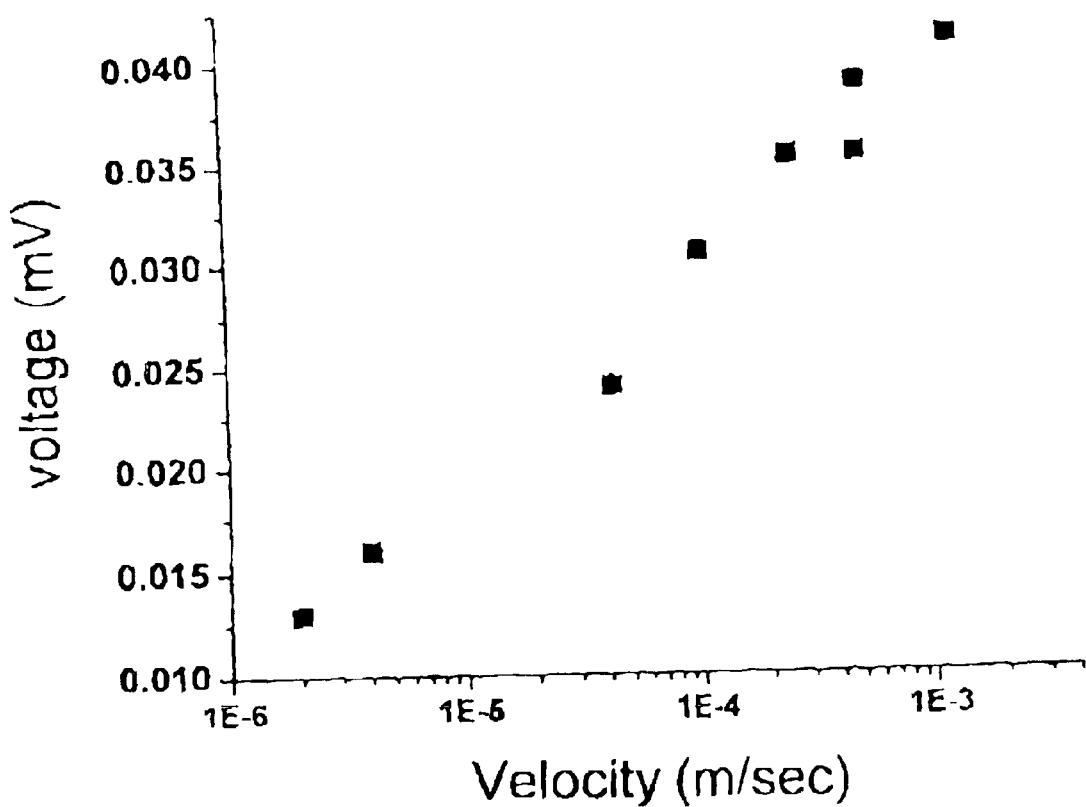
FIG. 5 is a graphical representation of the characteristic curve of the flow sensing device of the invention using human blood.

When the sensor bundle was immersed in blood it was observed that voltage developed only along the direction of the flow and not perpendicular thereto. The measurement protocol was as given in Example 1 above. The measurements were taken at different flow velocities for blood. The velocity and corresponding voltage values obtained are given in Table 1 below and also represented in FIG. 5. The values an FIG. 5 fits the empirical relation of $V=\alpha\log(\alpha\beta+1)$ where $\alpha=0.6$ mV and $\beta=6.5\times10^6$ seconds/meter and both $\alpha$ and $\beta$ are parameters. As can be seen the flow induced voltage is nearly substantially logarithmic to the flow velocity $\mu$.

TABLE I

| Velocity (m/s) | Voltage (mV) |
|---|---|
| 0.001 | 0.04 |
| 5E-4 | 0.038 |
| 4.89E-4 | 0.3449 |
| 2.5E-4 | 0.03449 |
| 1E-4 | 0.03 |
| 4.162E-5 | 0.02374 |
| 4E-6 | 0.016 |
| 2E-6 | 0.013 |

Advantages of the Invention

1. The response time of the device of the invention is very small (<0.01 seconds) and also highly accurate since the voltage generated is a function of the velocity along the flow and not across the cross section of the liquid flow.

2. The device does not require any colloidal particles and therefore the results are highly accurate.

3. The device does not require any external power source and is on the contrary capable of generating electricity.

4. The device is operable even at very low flow velocities, low flow volumes, does not require optical access to the measurement plane, is of easy and simple construction and therefore economical.

5. the device essentially composes of use of a carbon nanotube which is biocompatible which renders the flow sensor useful for biomedical applications such as in pacemakers.

We claim:

1. A flow sensing device useful for measurement of liquid flow velocities along the direction of the liquid flow and irrespective of a nature of the liquid, said device comprising at least one carbon nanotube, said at least one carbon nanotube being arranged between at least two conducting elements, the two conducting elements connecting the at least one carbon nanotube to an electricity measurement device for measuring electricity generated as a function of a rate of flow of the liquid.

2. A device as claimed in claim 1 wherein the carbon nanotube is a single wall type carbon nanotube.

3. A device as claimed in claim 1 wherein the carbon nanotube is of a multiwall type carbon nanotube.

4. A device as claimed in claim 1 wherein the electricity measurement device comprises an ammeter to measure a current generated across opposite ends of said at least one carbon nanotube or a voltmeter to measure a potential difference across the opposite ends of the at least one carbon nanotube.

5. A device as claimed in claim 1 wherein the flow sensing device further comprises of a plurality of carbon nanotubes all connected in series or parallel with a single one of the two conducting elements each being provided at the respective extreme ends of the plurality of carbon nanotubes.

6. A device as claimed in claim 5 wherein the plurality of carbon nanotubes are connected in series so as to measure a potential difference generated across the ends of the plurality of carbon nanotubes.

7. A device as claimed in claim 5 wherein the plurality of nanotubes are connected in parallel to each other so as to enable determination of a current generated across two ohmic contacts formed by the respective conducting elements at the ends thereof.

8. A device as claimed in claim 1 wherein the flow sensing device further comprises a protective insulating coating to prevent electrical contact with the liquid.

9. A device as claimed in claim 1 wherein the flow sensing device is provided on a insulated base.

10. A device as claimed in claim 1 wherein the conducting elements each comprises of a wire.

11. A device as claimed in claim 1 wherein the conducting elements each comprises of an electrode.

12. A device as claimed in claim 1 wherein the conducting elements each comprises of a combination of wire connected to an electrode.

13. A device as claimed in claim 1 wherein the liquid whose flow velocity is determined is flowing water.

14. A device as claimed in claim 1 wherein the liquid is a biological fluid.

15. A device as claimed in claim 1 wherein the biological fluid is blood.

16. A device as in claim 1 wherein the at least one carbon nanotube is immersed in the liquid at rest and generates a rest voltage in the nanotube, a velocity of the liquid being calculated as a function of a voltage generated in the carbon nanotube during flow after deduction of the rest voltage.

17. A device as in claim 1 wherein a response time of the flow sensing device is less than 0.01 seconds.

18. A device as in claim 1 wherein the flow sensing device generates the electricity without an external power source.

19. A device as in claim 1 wherein the flow sensing device measures a flow velocity of the liquid having a velocity on the order of $10^{-8}$ to $10^{-5}$ cm/sec.

20. A method for determination of liquid flow velocities irrespective of the nature of the liquid the method comprising: immersing in said liquid a flow sensing device comprising of at least one carbon nanotube arranged between two conducting elements which connect the at least one carbon nanotube to an electricity measurement device, the liquid flow over the at least one carbon nanotube generating a flow of electricity along the direction of the liquid flow by forcing free charges present in the at least one nanotube, the electrical energy generated by movement of the free charges in the nanotube being transmitted by said the conducting elements to the electricity measurement device provided external to the liquid flow, to measure electricity generated as a function of a rate of flow of the liquid.

21. A method as claimed in claim 20 wherein the liquid comprises a polar liquid.

22. A method as claimed in claim 21 wherein the polar liquid is selected from water and a biological fluid.

23. A method as claimed in claim 22 wherein the biological fluid is blood.

24. A method as claimed in claim 20 wherein the liquid comprises a non-polar liquid selected from methanol, ethanol, and any other non-polar liquid.

25. A method as claimed in claim 20 wherein the carbon nanotube is a single wall type carbon nanotube.

26. A method as claimed in claim 20 wherein the carbon nanotube is of a multiwall type carbon nanotube.

27. A method as in claim 20 wherein the electricity is generated without an external power source.

28. A method as in claim 20 wherein the flow sensing device measures a flow velocity of the liquid having a velocity on the order of $10^{-8}$ to $10^{-5}$ cm/sec.

29. A method for determination of liquid flow velocities irrespective of a nature of a liquid or the flow velocity thereof, which comprises measuring in said liquid a flow sensing device comprising of at least one carbon nanotube connected at each end through at least a conducting element to a electricity measurement means, the liquid flow over said at least one carbon nanotube generating a flow of electricity along the direction of the liquid flow by forcing free charges present in the at least one nanotube, said electrical energy being transmitted by said conducting element to said electricity measurement means provided external to the liquid flow, to measure the electricity generated as a function of a rate of flow of said liquid;

wherein the forcing of the free charges is along the direction of the liquid flow due to the Coulombic interaction between the Coulombic field of the liquid and the free charges, thereby ensuring that only velocity along the direction of the liquid flow is determined.

30. A method for determination of liquid flow velocities irrespective of a nature of the liquid or a flow velocity thereof, which comprises measuring in said liquid a flow sensing device comprising of at least one carbon nanotube connected at each end through at least a conducting element to a electricity measurement means, the liquid flow over said at least one carbon nanotube generating a flow of electricity along the direction of the liquid flow by forcing free charges present in the at least one nanotube, said electrical energy being transmitted by said conducting element to said electricity measurement means provided external to the liquid flow, to measure the electricity generated as a function of a rate of flow of said liquid wherein the at least one carbon nanotube is immersed in the liquid at rest and generates a rest voltage in the nanotube, an exact velocity of the liquid flow being calculated as a function of a voltage generated in the carbon nanotube during flow after deduction of the rest voltage.

31. A method for determination of liquid flow velocities irrespective of a nature of the liquid or a flow velocity thereof, which comprises measuring in said liquid a flow sensing device comprising of at least one carbon nanotube connected at each end through at least a conducting element to a electricity measurement means, the liquid flow over said at least one carbon nanotube generating a flow of electricity along the direction of the liquid flow by forcing free charges present in the at least one nanotube, said electrical energy being transmitted by said conducting element to said electricity measurement means provided external to the liquid flow, to measure the electricity generated as a function of a rate of flow of said liquid wherein a response time of the flow sensing device is less than 0.01 seconds.

32. An energy conversion device comprising a energy generation device comprising one or more carbon nanotubes, each of the one or more nanotubes comprising of at least one carbon nanotube arranged between two conducting elements connecting the at least one carbon nanotube to an electricity storage or usage device to store or use electricity generated in the at least one carbon nanotubes due to the liquid flow along the surface thereof.

33. An energy conversion device as claimed in claim 32 wherein the carbon nanotube is a single wall type carbon nanotube.

34. An energy conversion device as claimed in claim 32 wherein the carbon nanotube is of a multiwall type carbon nanotube.

35. An energy conversion device as claimed in claim 32 wherein the energy generation device comprises a plurality of carbon nanotubes.

36. An energy conversion device as claimed in claim 35 wherein the plurality of carbon nanotubes are connected in series.

37. An energy conversion device as claimed in claim 35 wherein the plurality of nanotubes are connected in parallel.

38. An energy conversion device as claimed in claim 32 wherein the energy conversion device further comprises a protective insulating coating to prevent electrical contact with the liquid, thereby ensuring that accidental discharge of electricity generated due to liquid flow along the surface thereof to the liquid does not occur.

39. An energy conversion device as claimed in claim 32 wherein the energy conversion device is provided on an insulated base.

40. An energy conversion device as claimed in claim 33 wherein the energy storage device comprises of a battery or storage cell.

41. An energy conversion device as claimed in claim 32 wherein the conducting elements each comprises of a wire.

42. An energy conversion device as claimed in claim 32 wherein the conducting elements each comprises of an electrode.

43. An energy conversion device as claimed in claim 32 wherein the conducting elements each comprises of a combination of a wire connected to an electrode.

44. An energy conversion device as claimed in claim 32 wherein the liquid whose flow velocity is determined is flowing water.

45. An energy conversion device as claimed in claim 32 wherein the liquid is a biological fluid.

46. An energy conversion device as claimed in claim 45 wherein the biological fluid is blood.

47. A method for the generating electrical energy using an energy conversion device comprising an energy generation device comprising one or more carbon nanotubes, each of said one or more nanotube comprising of at least one carbon nanotube arranged between two conducting elements connecting the at least one carbon nanotube to an electricity storage or usage device, the flow of the liquid along the surface of the energy conversion device forcing the free charges in the one or more carbon nanotubes to flow along the direction of the liquid flow, thereby generating electrical energy, said electrical energy being transmitted to the energy storage or usage device through the two conducting elements.

48. A method as claimed in claim 47 wherein the carbon nanotube is a single wall type carbon nanotube.

49. A method as claimed in claim 47 wherein the carbon nanotube is of a multiwall type carbon nanotube.

50. A method as claimed in claim 47 wherein the energy generation device comprises a plurality of carbon nanotubes.

51. A method as claimed in claim 50 wherein the plurality of carbon nanotubes are connected in series.

52. A method as claimed in claim 50 wherein the plurality of nanotubes are connected in parallel.

53. A method as claimed in claim 47 wherein the energy conversion device further comprises a protective insulating coating to prevent electrical contact with the liquid, thereby ensuring that accidental discharge of electricity generated due to liquid flow along the surface thereof to the liquid does not occur.

54. A method as claimed in claim 47 wherein the energy conversion device is provided on an insulated base.

55. A method as claimed in claim 47 wherein the energy storage device comprises a battery or storage cell.

56. A method as claimed in claim 47 wherein the energy conversion device functions as a battery of a cardiac pacemaker device.

57. A flow sensing device for measuring liquid flow velocities, the device comprising:
   two electrodes;
   at least one carbon nanotube sandwiched between the two electrodes; and
   an electricity measurement device for measuring electricity generated by the flow sensing device as a function of a rate of flow of the liquid, the electricity measurement device being connected to opposing ends of the carbon nanotube through the two electrodes.

58. A flow sensing device as in claim 57 wherein the flow sensing device generates electricity without an external power source.

* * * * *